(12) United States Patent
Zha

(10) Patent No.: US 12,105,919 B2
(45) Date of Patent: Oct. 1, 2024

(54) THREE-DIMENSIONAL TOUCH SENSOR AND DISPLAY DEVICE

(71) Applicant: Shenzhen China Star Optoelectronics Semiconductor Display Technology Co., Ltd., Shenzhen (CN)

(72) Inventor: Bao Zha, Shenzhen (CN)

(73) Assignee: Shenzhen China Star Optoelectronics Semiconductor Display Technology Co., Ltd., Shenzhen (CN)

( * ) Notice: Subject to any disclaimer, the term of this patent is extended or adjusted under 35 U.S.C. 154(b) by 0 days.

(21) Appl. No.: 17/417,398

(22) PCT Filed: May 19, 2021

(86) PCT No.: PCT/CN2021/094478
§ 371 (c)(1),
(2) Date: Nov. 3, 2022

(87) PCT Pub. No.: WO2022/227137
PCT Pub. Date: Nov. 3, 2022

(65) Prior Publication Data
US 2024/0012522 A1    Jan. 11, 2024

(30) Foreign Application Priority Data
Apr. 30, 2021    (CN) .......................... 202110480566.9

(51) Int. Cl.
*G06F 3/044* (2006.01)
*G06F 3/041* (2006.01)

(52) U.S. Cl.
CPC ........ *G06F 3/0445* (2019.05); *G06F 3/04144* (2019.05); *G06F 3/0447* (2019.05);
(Continued)

(58) Field of Classification Search
CPC .. G06F 3/0445; G06F 3/04144; G06F 3/0447; G06F 3/0412; G06F 3/0414;
(Continued)

(56) References Cited

U.S. PATENT DOCUMENTS

2018/0224991 A1*  8/2018  Gu .......................... G06F 3/0447
2019/0050080 A1*  2/2019  Bagheri .................. G06F 3/044
2019/0064965 A1   2/2019  Yoon et al.

FOREIGN PATENT DOCUMENTS

CN    105426005 A    3/2016
CN    105549251 A    5/2016
(Continued)

*Primary Examiner* — Adam J Snyder
(74) *Attorney, Agent, or Firm* — Nathan & Associates; Menachem Nathan

(57) ABSTRACT

A three-dimensional touch sensor and a display device are provided. The three-dimensional touch sensor determines a position of a touch force by a first capacitance formed by the pressure receiving electrodes and the transmitting electrodes, and determines a magnitude of the touch force by a second capacitance formed between the pressure receiving electrode and the pressure sensing electrode. Therefore, not only the position of the touch force but also the magnitude of the touch force can be determined. Synchronous sensing of the position and the magnitude of the touch force is achieved, which is beneficial to human-computer interaction.

16 Claims, 6 Drawing Sheets

(52) U.S. Cl.
CPC .......... *G06F 3/0412* (2013.01); *G06F 3/0414* (2013.01); *G06F 3/0446* (2019.05); *G06F 2203/04104* (2013.01); *G06F 2203/04105* (2013.01)

(58) Field of Classification Search
CPC ......... G06F 3/0446; G06F 2203/04104; G06F 2203/04105
See application file for complete search history.

(56) References Cited

FOREIGN PATENT DOCUMENTS

| | | | | |
|---|---|---|---|---|
| CN | 106293226 A | 1/2017 | | |
| CN | 106502444 A | 3/2017 | | |
| CN | 106598314 A | 4/2017 | | |
| CN | 107305447 A | * 10/2017 | ......... | G02F 1/13338 |
| CN | 109581714 A | 4/2019 | | |
| CN | 111596796 A | 8/2020 | | |
| CN | 113176837 A | 7/2021 | | |
| WO | 2018049582 A1 | 3/2018 | | |

* cited by examiner

THREE-DIMENSIONAL TOUCH SENSOR AND DISPLAY DEVICE

FIELD OF INVENTION

The present disclosure relates to the field of display technologies, and more particularly, to a three-dimensional touch sensor and a display device.

BACKGROUND OF INVENTION

With the development of display technologies, more and more functions are integrated in the display device, which also collaboratively contribute a new role to the display device. Touch sensors serve as sensing devices that sense people's touch. The touch sensors are an important bridge of human-computer interaction in the display device.

At present, the applications of touch technologies are getting more and more widespread. The current touch sensors in the display panel are mainly used for two-dimensional coordinate recognition, and cannot perform a function of sensing the magnitude of force. That is, the current touch sensors do not achieve the effect of three-dimensional touch sensing.

Therefore, it is necessary to provide a three-dimensional touch sensor and a display device that applies pressure touch technology to the current touch sensor, so that the current touch sensor can not only perform the coordinate recognition function, but also perform the function of sensing the magnitude of a force. Therefore, the display panel achieves full human-computer interaction by the touch sensor.

Technical Problems

The current touch sensors in the display panels are mainly used for two-dimensional coordinate recognition, and cannot perform the function of sensing the magnitude of a force. That is, the current touch sensors do not achieve the effect of three-dimensional touch sensing.

SUMMARY OF INVENTION

In order to solve the problem that the touch sensors in the current display panel scan only perform coordinate recognition and cannot sense the magnitude of touch force, the present disclosure provides a three-dimensional touch sensor and a display device to achieve synchronous sensing of a position and a magnitude of touch force, which facilitates human-computer interaction.

In a first aspect, the present disclosure provides a three-dimensional touch sensor, comprising a first electrode layer and a second electrode layer disposed in different planes, wherein the second electrode layer is deformable in a direction opposite to the first electrode layer;
wherein the first electrode layer comprises:
a plurality of transmitting electrodes disposed in an array, wherein the adjacent transmitting electrodes electrically are connected to each other in a first direction;
a plurality of pressure sensing electrodes disposed in an array, wherein the adjacent pressure sensing electrodes are electrically connected to each other in the first direction, and the pressure sensing electrodes and the transmitting electrodes are distributed in a staggered manner and insulated from each other;
wherein the second electrode layer comprises:
a plurality of pressure receiving electrodes disposed in an array, wherein the adjacent pressure receiving electrodes are electrically connected to each other in a second direction, and the second direction is perpendicular to the first direction;
wherein the pressure receiving electrodes and the pressure sensing electrodes are aligned with respect to each other, and the pressure receiving electrodes and the transmitting electrodes are arranged in a staggered manner.

In some embodiments, the second electrode layer comprises a deformation supporting layer and a passivation layer, the deformation support layer is disposed between the first electrode layer and the passivation layer, and the pressure receiving electrodes are disposed in the passivation layer.

In some embodiments, a first spacer and a second spacer are further disposed in the deformation supporting layer, the first spacer is disposed between the transmitting electrodes and the pressure receiving electrodes, the second spacer is disposed between the pressure sensing electrodes and the pressure receiving electrodes, and a height of the second spacer is smaller than a height of the first spacer.

In some embodiments, an insulating material is distributed between the transmitting electrode and the pressure sensing electrode.

In some embodiments, an area of the pressure receiving electrodes is larger than an area of the pressure sensing electrodes.

In some embodiments, shapes of the transmitting electrodes, the pressure sensing electrodes, and the pressure receiving electrodes are rhombus, square, or hexagon.

In some embodiments, the transmitting electrodes, the pressure sensing electrodes, and the pressure receiving electrodes are transparent electrodes.

In some embodiments, the deformation supporting layer is made of a transparent flexible material.

In a second aspect, the present disclosure also provide a display device, comprising: a display panel and the above-mentioned three-dimensional touch sensor, wherein the three-dimensional touch sensor is disposed on a front side of the display panel;
wherein the three-dimensional touch sensor comprises a first electrode layer and a second electrode layer disposed in different planes, and the second electrode layer is deformable in a direction opposite to the first electrode layer;
wherein the first electrode layer comprises:
a plurality of transmitting electrodes disposed in an array, wherein the adjacent transmitting electrodes are electrically connected to each other in a first direction;
a plurality of pressure sensing electrodes disposed in an array, wherein the adjacent pressure sensing electrodes are electrically connected to each other in the first direction, and the pressure sensing electrodes and the transmitting electrodes are distributed in a staggered manner and insulated from each other;
wherein the second electrode layer comprises:
a plurality of pressure receiving electrodes disposed in an array, wherein the adjacent pressure receiving electrodes are electrically connected to each other in a second direction, and the second direction is perpendicular to the first direction;
wherein the pressure receiving electrodes and the pressure sensing electrodes are aligned with respect to each other, and the pressure receiving electrodes and the transmitting electrodes are arranged in a staggered manner;

when the display panel receives a touch force, the transmitting electrodes and the pressure receiving electrodes are configured to form a first capacitance to determine a position of the touch force; the pressure sensing electrodes and the pressure receiving electrodes are configured to form a second capacitance to determine a magnitude of the touch force.

In some embodiments, the second electrode layer comprises a deformation support layer and a passivation layer, the deformation support layer is disposed between the first electrode layer and the passivation layer, the pressure receiving electrodes are disposed in the passivation layer.

In some embodiments, a first spacer and a second spacer are further disposed in the deformation supporting layer, the first spacer is disposed between the transmitting electrodes and the pressure receiving electrodes, the second spacer is disposed between the pressure sensing electrodes and the pressure receiving electrodes, and a height of the second spacer is smaller than a height of the first spacer.

In some embodiments, an insulating material is distributed between the transmitting electrode and the pressure sensing electrode.

In some embodiments, an area of the pressure receiving electrode is larger than an area of the pressure sensing electrode.

In some embodiments, shapes of the transmitting electrodes, the pressure sensing electrodes, and the pressure receiving electrodes are rhombus, square, or hexagon.

In some embodiments, the three-dimensional touch sensor further comprises an array substrate disposed on a side of the first electrode layer of the three-dimensional touch sensor close to the display panel.

In some embodiments, the three-dimensional touch sensor further comprises a packaging cover plate disposed on a side of the second electrode layer of the three-dimensional touch sensor away from the display panel.

In some embodiments, the display panel is a liquid crystal display panel, an OLED display panel, a mini-LED display panel, or a micro-LED display panel.

In some embodiments, a display mode of the display panel is one of a vertical alignment type, an in-plane switching type, a twisted nematic type, and an fringe field switching type.

In some embodiments, the transmitting electrodes, the pressure sensing electrodes, and the pressure receiving electrodes are transparent electrodes.

In some embodiments, the deformation supporting layer is made of a transparent flexible material.

Beneficial Effects

The present disclosure provides a three-dimensional touch sensor and a display device. In the three-dimensional touch sensor, a plurality of pressure sensing electrodes and a plurality of transmitting electrodes are distributed in a staggered manner and insulated from each other on a first electrode layer, and a plurality of pressure receiving electrodes are disposed on a second electrode layer. The pressure receiving electrodes and the pressure sensing electrodes are aligned in respect with each other, and the pressure receiving electrodes and the transmitting electrodes are arranged in a staggered manner, so that a position of a touch force is determined by the first capacitance formed between the pressure receiving electrodes and the transmitting electrodes, and a magnitude of the touch force is determined by the second capacitance formed between the pressure receiving electrode and the pressure sensing electrode. Therefore, not only the position of the touch force is determined, but also the magnitude of the touch force. The synchronous sensing of the position and the magnitude of the touch force are achieved, which is beneficial to achieve the human-computer interaction by the three-dimensional touch sensor and display device.

Figure 1:
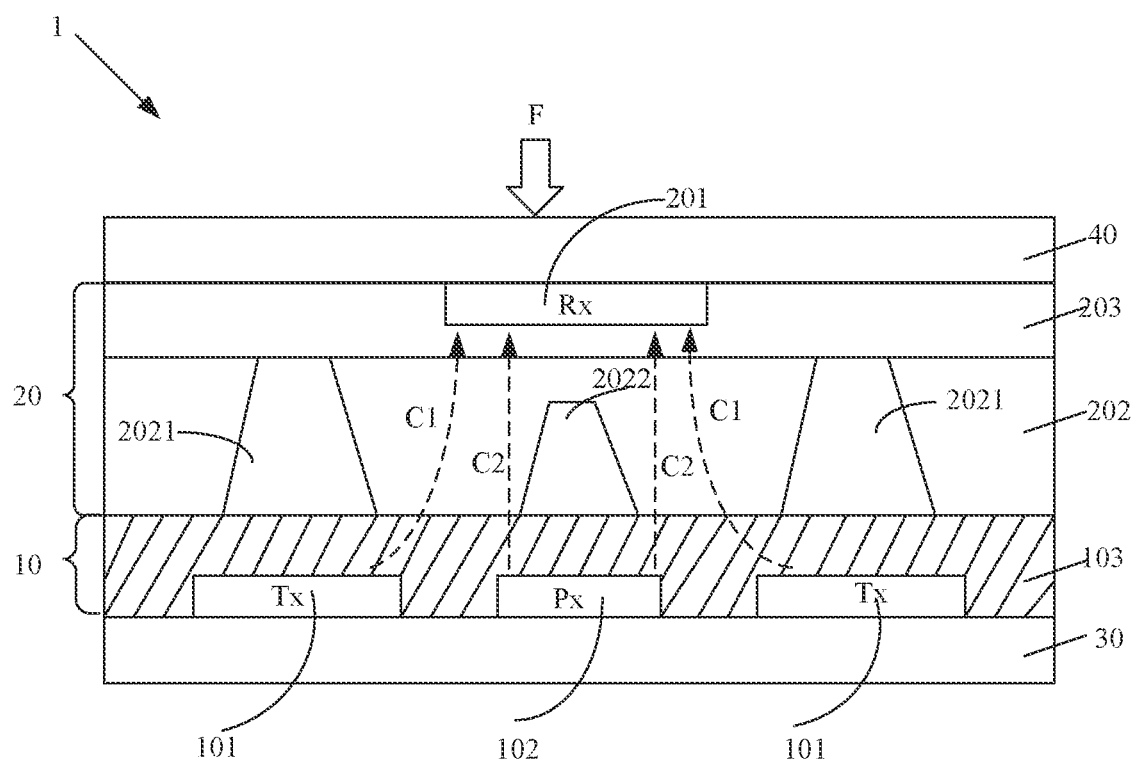
FIG. 1 is a cross-sectional view of a three-dimensional touch sensor provided by an embodiment of the present disclosure.

In which:
1: three-dimensional touch sensor; 10: a first electrode layer; 101: a transmitting electrode;
102: a pressure sensing electrode; 20: a second electrode layer; 201: a pressure receiving electrode;
202: a deformation support layer; 2021: a first spacer; 2022: a second spacer;
203: a passivation layer; 30: an array substrate; 40: a packaging cover plate;
50: a display panel.

DETAILED DESCRIPTION OF PREFERRED EMBODIMENTS

In order to make purposes, technical solutions, and effects of the application to be clearer and more specific, the present disclosure is further described with reference to the drawings and examples. It is to be understood that the specific embodiments described herein are only used to explain the present disclosure, and are not intended to limit the present disclosure.

In the drawings of the embodiments of the present disclosure, the thicknesses of each electrode layer and film, the sizes and shapes of each electrode, and the heights of the spacers are only examples, and the purpose is only to illustrate the protection content of each embodiment of the present disclosure.

An embodiment of the present disclosure provides a three-dimensional touch sensor 1. FIG. 1 is a cross-sectional view of the three-dimensional touch sensor provided by an embodiment of the present disclosure. As shown in FIG. 1, the three-dimensional touch sensor 1 includes a first electrode layer 10 and a second electrode layer 20 disposed in different planes. The second electrode layer 20 can be deformed in a direction opposite the first electrode layer 10.

Figure 2:
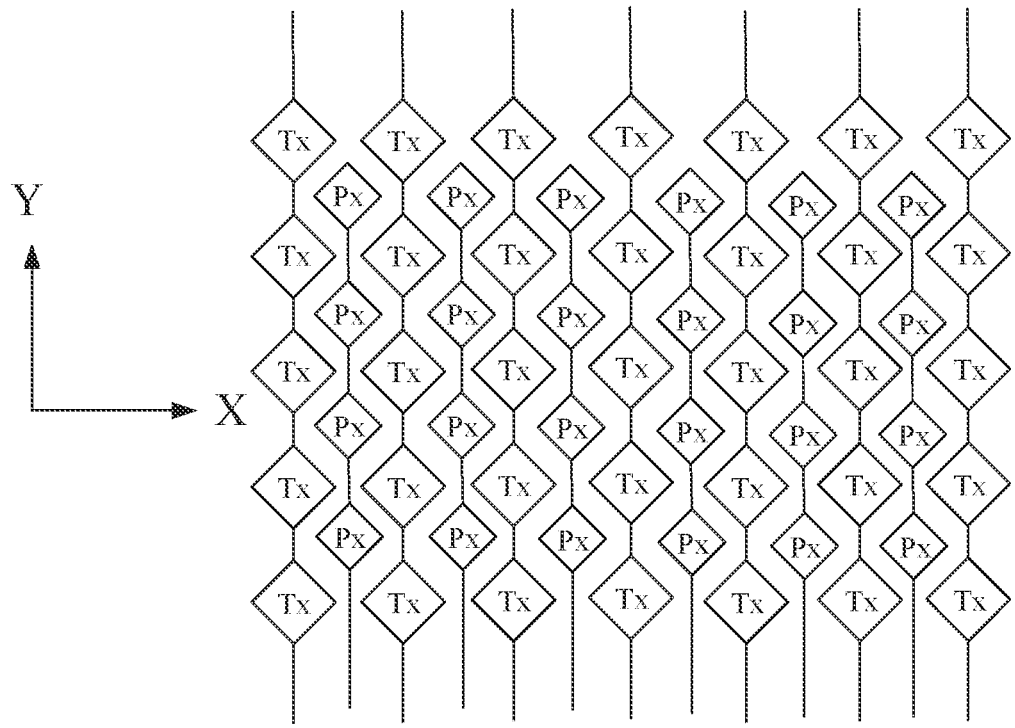
FIG. 2 is a schematic structural view of a plurality of transmitting electrodes and a plurality of pressure sensing electrodes of the three-dimensional touch sensor provided by the embodiment of the present disclosure.

FIG. 2 is a schematic structural view of a plurality of transmitting electrodes Tx and a plurality of pressure sensing electrodes Px of the three-dimensional touch sensor provided by the embodiment of the present disclosure. As shown in the combination of FIG. 1 and FIG. 2, the first electrode layer 10 includes the transmitting electrode Tx 101 are disposed in an array. The adjacent transmitting electrodes Tx 101 are electrically connected to each other in a first direction Y. The pressure sensing electrodes Px 102 are disposed in an array. The adjacent pressure sensing electrodes Px 102 are electrically connected to each other in the first direction Y. The pressure sensing electrodes Px 102 and the transmitting electrodes Tx 101 are distributed in a staggered manner and insulated from each other.

Figure 3:
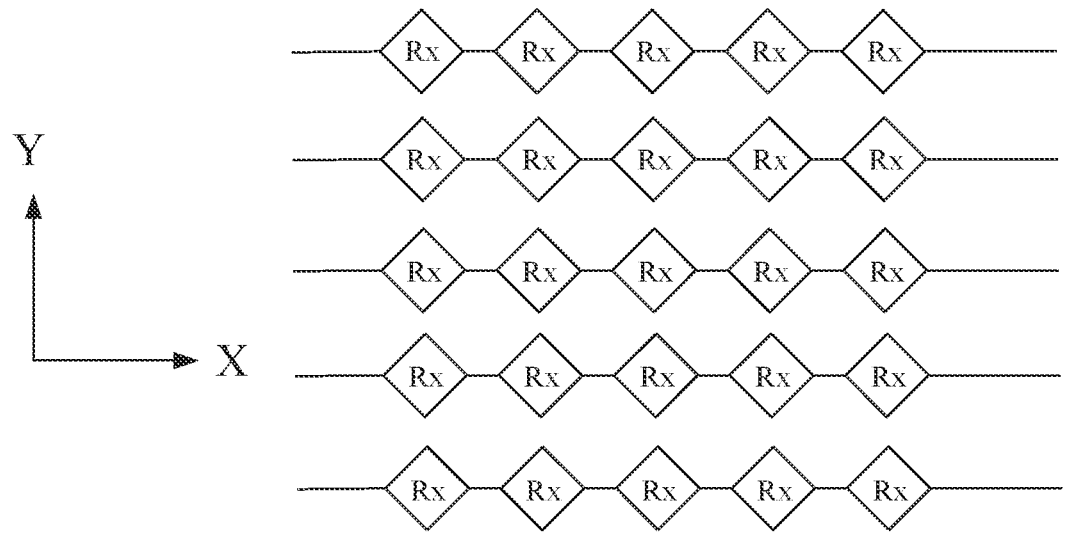
FIG. 3 is a schematic structural view of a plurality of pressure receiving electrodes provided by the embodiment of the present disclosure.

FIG. 3 is a schematic structural view of a plurality of pressure receiving electrodes Rx provided by the embodiment of the present disclosure. As shown in the combination of FIG. 1 and FIG. 3, the second electrode layer 20 includes the pressure receiving electrodes Rx 201 disposed in an array. The adjacent pressure receiving electrodes Rx 201 are electrically connected to each other in a second direction X. The first direction Y is perpendicular to the second direction X. The pressure receiving electrodes Rx 201 and the pressure sensing electrodes Px 102 are aligned with respect to each other. The pressure receiving electrodes Rx 201 and the transmitting electrodes Tx 101 are arranged in a staggered manner.

Specifically, in the present embodiment, for example, the first electrode layer 10 is disposed in a lower position, the second electrode layer 20 is disposed in an upper position, the first direction Y is a column, and the second direction X is a row. In the first electrode layer 10, each column of the transmitting electrodes Tx are connected in sequence. Each column of the pressure sensing electrodes Px are connected in sequence. The transmitting electrodes Tx in the same row are located between two adjacent rows of pressure sensing electrodes Px. The transmitting electrodes Tx in the same column are located between two adjacent columns of pressure sensing electrodes Px. Furthermore, in the second electrode layer 20, each row of the pressure receiving electrodes Rx is connected in sequence, and the pressure receiving electrodes Rx and the pressure sensing electrodes Px of the first electrode layer 10 are aligned with respect to each other. The pressure sensing electrodes Px and the transmitting electrodes Tx are distributed in a staggered manner and insulated from each other.

As shown in FIG. 1, a first capacitance C1 is formed between the transmitting electrodes Tx and the pressure receiving electrodes Rx. A second capacitance C2 is formed between the pressure sensing electrodes Px and the pressure receiving electrodes Rx. When the three-dimensional touch sensor 1 receives a touch force F, the position of the touch force F is determined according to a change of the first capacitance C1 formed between the transmitting electrodes Tx and the pressure receiving electrodes Rx. The magnitude of the touch force F is determined according to a change of the second capacitance C2 formed between the pressure sensing electrodes Px and the pressure receiving electrodes Rx.

Figure 5:
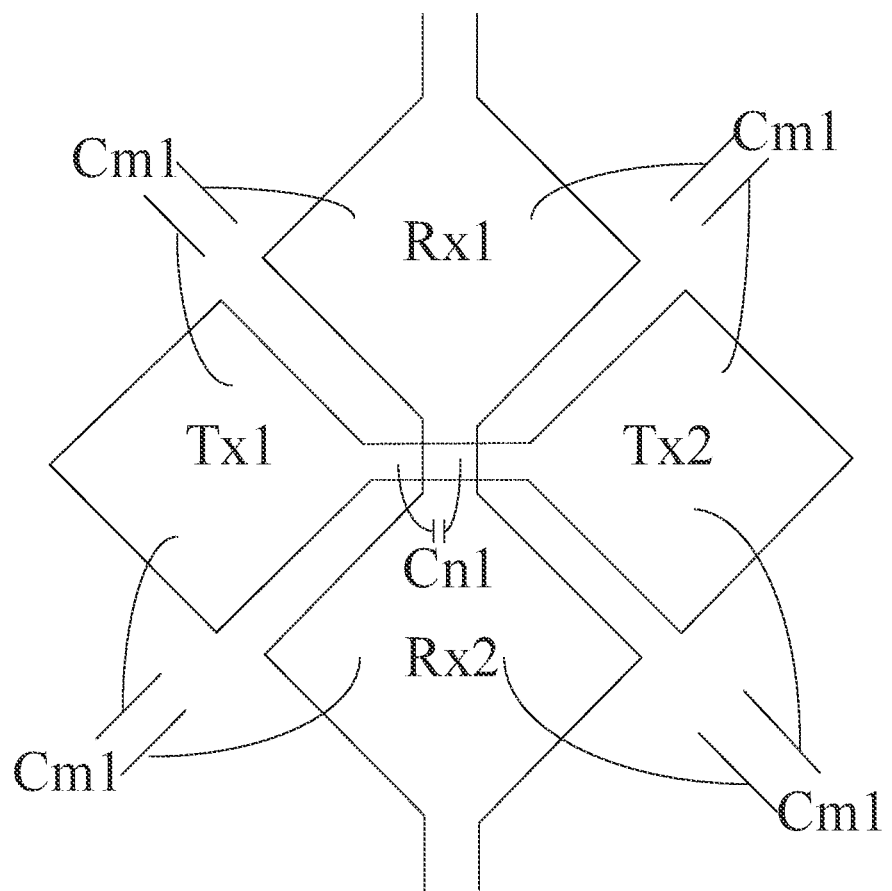
FIG. 5 is a partial top view of the transmitting electrodes and the pressure receiving electrodes provided by the embodiment of the present disclosure.

Specifically, as shown in FIG. 1 and FIG. 5, the pressure receiving electrodes Rx is disposed in the upper second electrode layer 20. The transmitting electrodes Tx are disposed in the lower first electrode layer 10. The first capacitance C1 formed between the transmitting electrodes Tx and the pressure receiving electrodes Rx is composed of an inherent capacitance Cn1 and a projected capacitance Cm1. The inherent capacitance Cn1 is formed by an overlapping area between the pressure receiving electrodes Rx and the transmitting electrodes Tx. According to the capacitance equation, the inherent capacitance formed between the pressure receiving electrodes Rx and the transmitting electrodes Tx are $Cn1 = eS1/d$, in which e is a dielectric constant of the capacitor and remains unchanged; S1 is an area of the overlapping area between the two electrodes that form the capacitance, and, that is, the pressure receiving electrodes Rx and the transmitting electrodes Tx; d1 is a vertical distance between the two electrodes that form the capacitance, that is, the pressure receiving electrodes Rx and the transmitting electrodes Tx. Moreover, the projected capacitance Cm1 formed between the pressure receiving electrodes Rx and the transmitting electrodes Tx is formed by the overlapping area of the pressure receiving electrodes Rx and the transmitting electrodes Tx.

Based on the above description, because the staggered arrangement of the transmitting electrodes Tx and the pressure receiving electrodes Rx, the inherent capacitance Cn1 formed between the transmitting electrodes Tx and the pressure receiving electrodes Rx is relatively small while the projected capacitance Cm1 is relatively large. A change of C1 is mainly caused by Cm1. A change of Cm1 is negligible with respect to the change of C1, so that when the three-dimensional touch sensor 1 receives the touch force F, the change of C1 is mainly determined by Cm1, that is, the change of C1 is mainly used for reflecting the position of the touch force F.

Figure 6:
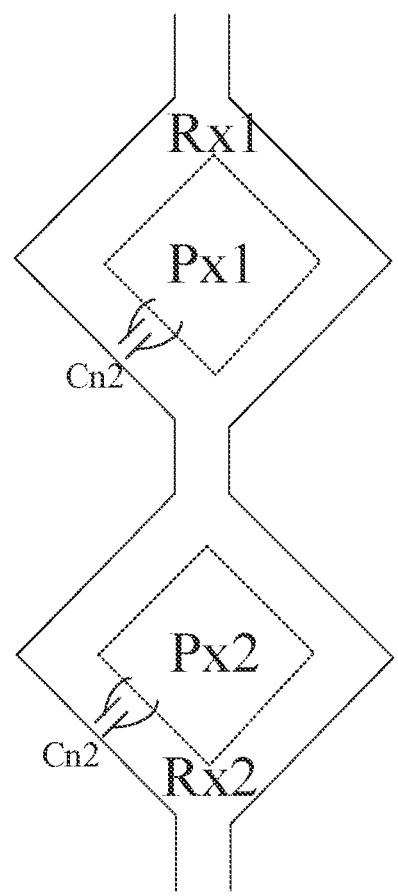
FIG. 6 is a partial top view of the pressure sensing electrodes and the pressure receiving electrodes provided by the embodiment of the present disclosure.

Furthermore, as shown in the combination of FIG. 1 and FIG. 6, the pressure receiving electrodes Rx are disposed in the upper second electrode layer 20. The pressure sensing electrodes Px are disposed in the lower first electrode layer 10. The second capacitance C2 formed between the pressure receiving electrodes Rx and the pressure sensing electrodes Px is composed of the inherent capacitance Cn2 and the projected capacitance Cm2 (not shown in the figure). The pressure receiving electrodes Rx and the pressure sensing electrodes Px are disposed opposite each other, so that the projected capacitance Cm2 between the pressure receiving electrodes Rx and the pressure sensing electrodes Px is relatively small, and the inherent capacitance Cn2 is relatively large. That is, the change of C2 is mainly caused by Cn2, and the change of Cm2 can be negligible with respect to the change of C2. In this way, when the three-dimensional touch sensor 1 receives the touch force F, the change of C2 is mainly determined by Cn2, and that is, the change of C2 is mainly used to reflect the magnitude of the touch force F.

In the three-dimensional touch sensor provided by the embodiments of the present disclosure, the first electrode layer and the second electrode layer are disposed in different planes. The second electrode layer can deform in the direction opposite the first electrode layer, so that when a touch force is applied on the three-dimensional touch sensor, the position and magnitude of the touch force can be obtained according to the capacitance change between the first electrode layer and the second electrode layer. Specifically, the pressure sensing electrodes Px and the transmitting electrodes Tx are distributed in a staggered manner and insulated from each other on the first electrode layer 10. The pressure receiving electrodes Rx are disposed on the second electrode layer 20. The pressure receiving electrodes Rx and the pressure sensing electrode Px are aligned and disposed in a staggered arrangement with the transmitting electrodes Tx, so that the change of the first capacitance C1 formed between the pressure receiving electrodes Rx and the transmitting electrodes Tx determines the position of the touch force. The change of the second capacitance C2 formed between the pressure receiving electrodes Rx and the pressure sensing electrodes Px determines the size of the touch force. The change of the capacitance C1 and the change of the second capacitance C2 determine the position and magnitude of the touch force. Compared with the prior art, the position and the magnitude of the touch force are simultaneously determined by the change of one single capacitance formed between the pressure receiving electrodes and the pressure sensing electrodes. The three-dimensional touch sensor provided by the embodiments of the present disclosure increase the touch accuracy, so that the display device can effectively support the function of multi-touch.

It can be understood that the adjacent transmitting electrodes Tx and the adjacent pressure sensing electrodes Px are connected in sequence in the first direction Y on the first electrode layer 10. The adjacent pressure receiving electrodes Rx are connected in sequence in the second electrode layer 20 in the second direction X. The second direction X is perpendicular to the first direction Y, so that the connecting wirings of the transmitting electrodes Tx or the pressure sensing electrodes Px can be perpendicular to the pressure receiving electrodes Rx, thereby reducing electromagnetic interference between the connecting wirings of the transmitting electrodes Tx or the pressure sensing electrodes Px and the connecting wirings of the pressure receiving electrode Rx, and preventing the influences on the formation of the first capacitance C1 and the second capacitance C2, and the measurement of the change value of the first capacitance C1 and the second capacitance C2.

As shown in FIG. 1, the first electrode layer includes an insulating layer 103. The transmitting electrodes Tx and the pressure sensing electrodes Px are disposed in the insulating layer 103. The second electrode layer 20 includes a deformation supporting layer 202 and a passivation layer 203. The deformation supporting layer 202 is disposed between the first electrode layer 10 and the passivation layer 203. The pressure receiving electrodes Rx is disposed in the passivation layer 203. The deformation supporting layer 202 is generally made of a transparent flexible material, such as polydimethylsiloxane (PDMS). The flexibility of PDMS is used to cause deformation, so that the second electrode layer 20 can deform in a direction opposite the first electrode layer 10. In addition, the pressure receiving electrodes Rx are disposed in the passivation layer 203. By using the passivation layer 203, a surface of the pressure receiving electrodes Rx is transformed into a state in which the surface is not easily oxidized, thereby delaying a corrosion rate of the pressure receiving electrodes Rx and playing a role in anti-corrosion to the pressure receiving electrodes Rx.

As shown in FIG. 1, a first spacer 2021 and a second spacer 2022 are further disposed within the deformation support layer 202. The first spacer 2021 is disposed between the transmitting electrodes Tx and the pressure receiving electrodes Rx. The second spacer 2022 is disposed between the pressure sensing electrodes Px and the pressure receiving electrodes Rx. A height of the second spacer 2022 is smaller than a height of the first spacer 2021. The first spacer 2021 is used for maintaining the distance between the pressure receiving electrodes Rx and the transmitting electrodes Tx unchanged. The second spacer 2022 is used for maintaining a certain gap between the pressure receiving electrodes Rx and the pressure sensing electrodes Px, so that when the three-dimensional touch sensor 1 receives the touch force F, a vertical distance between the pressure receiving electrodes Rx and the pressure sensing electrodes Px can be changed.

Specifically, FIG. 5 is a partial top view of the transmitting electrodes Tx and the pressure receiving electrodes Rx provided by the embodiment of the application. As shown in FIG. 5, the partial section is composed of two transmitting electrodes Tx1 and Tx2 and two pressure receiving electrodes Rx1 and Rx2. The first capacitance formed between TX1 and RX1 is $C1=Cn1+Cm1$. When the three-dimensional touch sensor 1 receives the touch force F, the first spacer 2021 maintain the vertical distance d1 between the pressure receiving electrodes Rx and the transmitting electrodes Tx unchanged. The area S of the overlapping area between the pressure receiving electrode Rx and the transmitting electrodes Tx (the overlapping area of the respective connecting wires in the middle) is also unchanged. Therefore, the capacitance value of the inherent capacitance Cn1 between the pressure receiving electrode Rx and the transmitting electrode Tx remains unchanged, while the projected capacitance Cm1 between the pressure receiving electrodes Rx and the transmitting electrodes Tx will be changed due to the touch of the hand, so that the first capacitance C1 will be changed. In this way, the position of the touch force can be determined according to the change of the first capacitance C1.

It is noted that the projected capacitance Cm1 can be detected only when the changed value $\Delta Cm1$ reaches more than 10% of the first capacitance C1. Therefore, the overlapping area between the pressure receiving electrodes Rx and the transmitting electrodes Tx cannot be too large, and, that is, the pressure receiving electrodes Rx and the transmitting electrodes Tx are disposed opposite to each other. Only the overlapping areas of the respective connecting wires in the middle are overlapped. Otherwise, the inherent capacitance Cn1 between the pressure receiving electrodes Rx and the transmitting electrodes Tx will be too large, so the first capacitance C1 will also become larger. The ratio of the changed value $\Delta Cm1$ of the projected capacitance Cm1 between the pressure receiving electrodes Rx and the transmitting electrodes Tx in the first capacitance C1 become smaller. The amount of change $\Delta Cm1$ of the projected capacitance Cm1 between the pressure receiving electrodes Rx and the transmitting electrodes Tx is not easy to be detected. Therefore, the accuracy of determining the position of the touch force according to the change of the capacitance value of the first capacitance C1 is not high.

Furthermore, FIG. 6 is a partial top view of the pressure sensing electrodes Px and the pressure receiving electrodes Rx provided by the embodiment of the application (FIG. 6 shows the case that the area of the pressure receiving electrodes Rx is larger than the area of the pressure sensing electrode Px). As shown in FIG. 6, in the area formed by the two pressure sensing electrodes Px1 and PX2 and the two pressure receiving electrodes Rx1 and Rx2, the second capacitance $C2=Cn2+Cm2$ formed between PX1 and RX1 or between PX2 and RX2, when the three-dimensional touch sensor 1 receives a touch force F, the second spacer 2022 enables the vertical distance d2 between the pressure receiving electrodes Rx and the pressure sensing electrodes Px to be changed. According to the capacitance equation, the intrinsic capacitance between Px between the pressure receiving electrodes Rx and the pressure sensing electrodes Px is $Cn2=eS2/d2$, in which e is the dielectric constant of the capacitor which remains unchanged; d2 is the vertical distance between the pressure receiving electrodes Rx and the pressure sensing electrodes Px; S2 is the overlapping area between the pressure receiving electrodes Rx and the pressure sensing electrodes Px. When the three-dimensional touch sensor receives a touch force F, the overlapping area S2 between the pressure receiving electrode Rx and the pressure sensing electrode Px remains unchanged. The vertical distance d2 between the pressure receiving electrodes Rx and the pressure sensing electrodes Px is changed, so that the inherent capacitance Cn2 between the pressure receiving electrodes Rx and the pressure sensing electrodes Px is changed, that is, the second capacitance C2 is changed. Therefore, the magnitude of the touch force F can be determined based on the change of the capacitance value of the second capacitance value C2.

Figure 4:
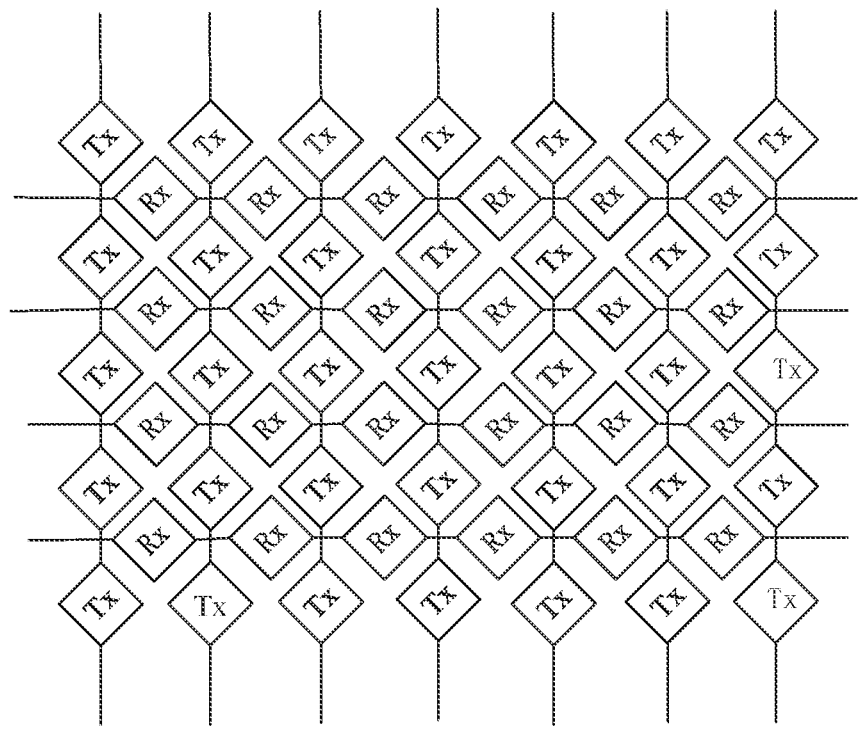
FIG. 4 is a top view of the transmitting electrodes, the pressure sensing electrodes, and the pressure receiving electrodes provided by the embodiment of the present disclosure.

It is noted that the size relationship between the area of one single pressure receiving electrodes Rx and the area of one single pressure sensing electrodes Px is not limited. However, in order to make the three-dimensional touch sensor receive a touch force, the contact between the finger and the pressure receiving electrode Rx is more sufficient. FIG. 4 is a top view of the transmitting electrodes Tx, the pressure sensing electrodes Px, and the pressure receiving electrodes Rx provided by the embodiments of the present application. As shown in FIG. 4, the area of the pressure receiving electrodes Rx is generally set to be larger than the area of the pressure sensing electrodes Px, so the pressure receiving electrodes Rx can only be seen from the top view.

In some embodiments, an insulating material is distributed between the transmitter electrodes Tx and the pressure sensing electrodes Px. The insulating material is used for insulating the transmitter electrodes Tx and the pressure sensing electrodes Px from each other to prevent the formation of the interference capacitance formed between the transmitter electrodes Tx and the pressure sensing electrodes Px. The interference capacitance affects the formation and measurement of the first capacitance C1 and the second capacitance C2, so as to affect the determination of the position and magnitude of the touch force F. The insulating material can be a commonly used insulating material, such as silicon oxide or silicon nitride.

In some embodiments, a shape of the transmitting electrodes Tx, the pressure sensing electrodes Px, and the pressure receiving electrodes Rx are rhombus, square, or hexagon, which is not limited herein.

It is noted that the transmitting electrodes Tx, the pressure sensing electrodes Px, and the pressure receiving electrodes Rx are all transparent electrodes.

Figure 7:
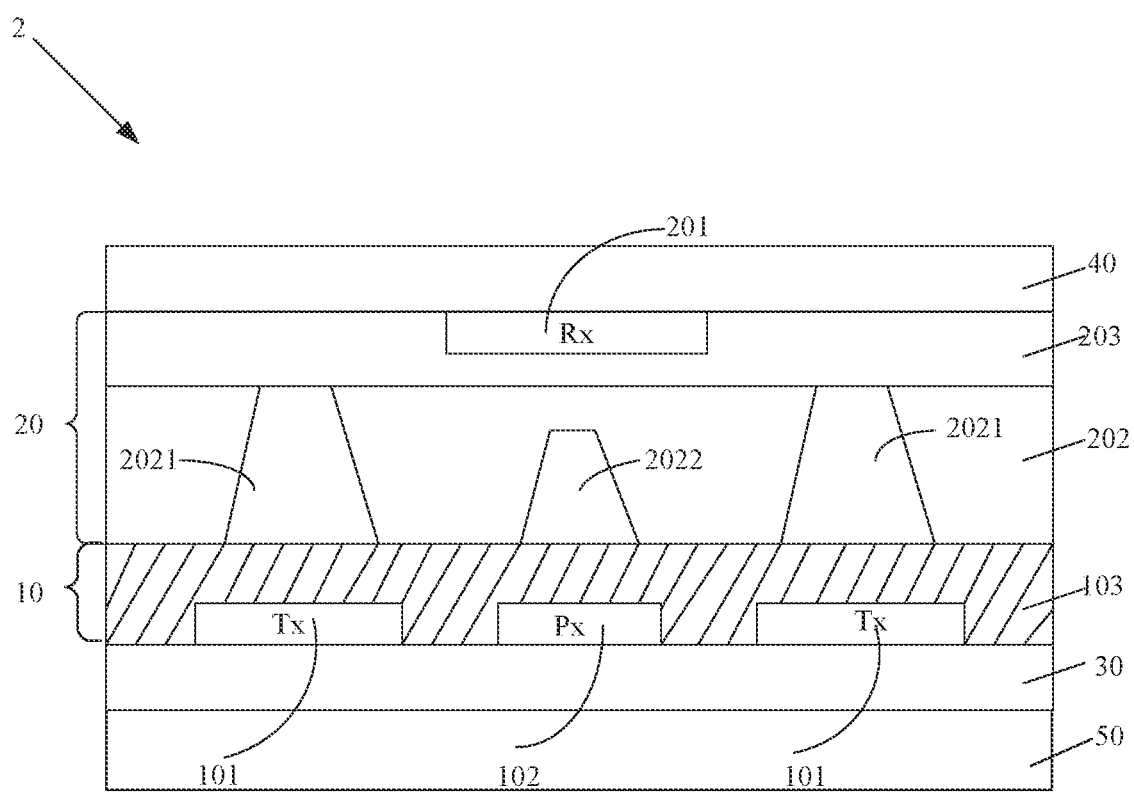
FIG. 7 is a cross-sectional view of a display device provided by the embodiment of the present disclosure.

FIG. 7 is a cross-sectional view of a display device provided by the embodiment of the present disclosure. As shown in FIG. 7, the present disclosure also provides the display device 2. The display device 2 includes a display panel 50 and the above-mentioned three-dimensional touch sensor 1. The three-dimensional touch sensor 1 is provided on a front side of the display panel 50. Understandably, the front side of the display panel 50 refers to the side of the display panel 50 used for displaying. In this way, when the three-dimensional touch sensor 1 receives the touch force, the position and the size of the touch force F are determined according to the change of the first capacitance C1 and the change of the second capacitance C2. The position and the size of the touch force F are reflected on the front side of the display panel 50.

In the display device 2 provided by the embodiment of the present disclosure, the pressure sensing electrodes Px and the transmitting electrodes Tx that are arranged in a staggered manner and insulated from each other on the first electrode layer 10. The pressure receiving electrodes Rx are disposed on the second electrode layer 20. The pressure receiving electrodes Rx and the pressure sensing electrodes Px are aligned opposite each other, and the pressure receiving electrodes and the transmitting electrodes Tx are arranged in a staggered manner, so that the position of the touch force can be determined by the first capacitance C1 formed between the pressure receiving electrodes Rx and the transmitting electrodes Tx. The magnitude of the touch force can be determined by the second capacitance C2 formed between the pressure receiving electrodes Rx and the pressure sensing electrodes Px determines. Therefore, the position and the magnitude of the touch force are determined by the change of the first capacitance C1 and the change of the second capacitance C2, respectively. Compared with the prior art, the position and the magnitude of the touch force can be determined simultaneously by the change of one single capacitance formed between the pressure receiving electrodes and the pressure sensing electrodes. The three-dimensional touch sensor provided by the embodiments of the present disclosure increases the touch accuracy, so that the display device can better support the function of multi-touch.

The three-dimensional touch sensor 1 further includes an array substrate 30. The array substrate 30 is disposed on a side of the first electrode layer 10 of the three-dimensional touch sensor 1 close to the display panel 50. The three-dimensional touch sensor further includes a packaging cover plate 40. The packaging cover plate is disposed on a side of the second electrode layer 20 of the three-dimensional touch sensor 1 away from the display panel 50. That is, the three-dimensional touch sensor 1 is disposed above the display panel 50. The three-dimensional touch sensor 1 and the display panel 50 are bonded together by an optical clear adhesive (OCA) optical glue. The display panel 50 and the array substrate 30 of the three-dimensional touch sensor 1, the first electrode layer 10, the second electrode layer 20, and the packaging cover plate 40 are disposed in sequence from bottom to top.

Specifically, when the three-dimensional touch sensor 1 is disposed on the array substrate 30, the base substrate of the array substrate 30 can be manufactured by the same base substrate as the base substrate of the three-dimensional touch sensor 1. The array substrate 30 may be a glass substrate, flexible substrates, such as polyethylene terephthalate (PET), polyimide (PI), or colorless polyimide (CPI), so that the three-dimensional touch sensor can be manufactured into a flexible three-dimensional touch sensor, which has the characteristics of light, thin, portable, excellent electrical performance, and high integration, which can be widely used in wearable electronic equipment, robots, medical machinery, and other fields. When the first electrode layer 10 of the three-dimensional touch sensor is a transparent electrode, the first electrode layer 10 is disposed in the same layer as a pixel electrode on the array substrate 30, or disposed in the same layer as a common electrode on the array substrate 30, or serves as an electrode formed by a separate transparent conductive layer. When the first electrode layer 10 is provided in the same layer as the pixel electrode on the array substrate 30, or is provided in the same layer as the common electrode on the array substrate 30, in the practical production process, the first electrode layer 10 can be fabricated at the same time as the pixel electrode on the array substrate 30 or the common electrode on the array substrate 30, which saves the manufacturing processes and processing time, and reduces the production costs. Similarly, when the second electrode layer 20 of the three-dimensional touch sensor 1 is a transparent electrode, the second electrode layer 20 can also be disposed in the same layer as the pixel electrode on the array substrate 30, or in the same layer as the common electrode on the array substrate 30, or serves as an electrode formed by a separate transparent conductive layer, as long as it conforms to the arrangement in which the first electrode layer 10 and the second electrode layer 20 are disposed in different planes. The first electrode layer 10 and the second electrode layer 20 may be one or more of Cu, Al, Au, Pt, Ag, Mo, and other metals having good conductivity, or an alloy formed by these metals, or may be indium tin oxide (ITO) or organic conductive polymer PEDOT, metal nanowires, graphene, or carbon nanotubes. Other materials having good conductivity can also be used.

Furthermore, during the operation of the display device 2, when the three-dimensional touch sensor 1 receives the touch force F, the position of the touch force F is determined by the change of the first capacitance C1 formed between the transmitting electrodes Tx and the pressure receiving electrodes R. The magnitude of the touch force F is determined by the change of the second capacitance C2 formed between the pressure sensing electrodes Px and the pressure receiving electrodes Rx.

In some embodiments, the display panel 50 of the display device 2 is a liquid crystal display panel 50, an OLED display panel 50, a mini-LED display panel 50, or a Micro-LED display panel 50. The display panel 50 can be a COA architecture (Color Filter On Array in which the color filters are disposed on the array substrate 30) or a non-COA architecture (non-color filter on array in which the color filters are not disposed on the array substrate 30). A display mode of the display panel 50 may be vertical array type (VA), in-plane switching type (IPS), twisted nematic type (TN), fringe field switching (FFS), etc.

In some embodiments, the display device 2 can be a liquid crystal display, a liquid crystal television (TV), an organic light emitting diode display, an organic light emitting diode TV, a micro-LED display, or a micro-LED TV.

Understandably, one of ordinarily skill in the art can carry out equivalent modifications and changes to the described embodiment according to technical solutions and technical concepts of the present application, and all such modifications and changes are considered encompassed in the scope of protection defined by the claims of the present application.

The invention claimed is:

1. A three-dimensional touch sensor, comprising a first electrode layer and a second electrode layer disposed in different planes, wherein the second electrode layer is deformable in a direction opposite to the first electrode layer;
wherein the first electrode layer comprises:
a plurality of transmitting electrodes disposed in an array, wherein the adjacent transmitting electrodes electrically are connected to each other in a first direction;
a plurality of pressure sensing electrodes disposed in an array, wherein the adjacent pressure sensing electrodes are electrically connected to each other in the first direction, and the pressure sensing electrodes and the transmitting electrodes are distributed in a staggered manner and insulated from each other;
wherein the second electrode layer comprises:
a plurality of pressure receiving electrodes disposed in an array, wherein the adjacent pressure receiving electrodes are electrically connected to each other in a second direction, and the second direction is perpendicular to the first direction;
wherein the pressure receiving electrodes and the pressure sensing electrodes are aligned with respect to each other, and the pressure receiving electrodes and the transmitting electrodes are disposed in a staggered manner,
wherein the second electrode layer comprises a deformation supporting layer and a passivation layer, the deformation support layer is disposed between the first electrode layer and the passivation layer, and the pressure receiving electrodes are disposed in the passivation layer,
wherein a first spacer and a second spacer are further disposed in the deformation supporting layer, the first spacer is disposed between the transmitting electrodes and the pressure receiving electrodes, the second spacer is disposed between the pressure sensing electrodes and the pressure receiving electrodes, and a height of the second spacer is smaller than a height of the first spacer, the first spacer being used for maintaining a distance between the pressure receiving electrodes and the transmitting electrodes unchanged, and the second spacer being used for maintaining a certain gap between the pressure receiving electrodes and the pressure sensing electrodes.

2. The three-dimensional touch sensor of claim 1, wherein an insulating material is distributed between the transmitting electrode and the pressure sensing electrode.

3. The three-dimensional touch sensor of claim 1, wherein an area of the pressure receiving electrodes is larger than an area of the pressure sensing electrodes.

4. The three-dimensional touch sensor of claim 1, wherein shapes of the transmitting electrodes, the pressure sensing electrodes, and the pressure receiving electrodes are rhombus, square, or hexagon.

5. The three-dimensional touch sensor of claim 1, wherein the transmitting electrodes, the pressure sensing electrodes, and the pressure receiving electrodes are transparent electrodes.

6. The three-dimensional touch sensor of claim 1, wherein the deformation supporting layer is made of a transparent flexible material.

7. A display device, comprising: a display panel and a three-dimensional touch sensor, wherein the three-dimensional touch sensor is disposed on a front side of the display panel;
wherein the three-dimensional touch sensor comprises a first electrode layer and a second electrode layer disposed in different planes, and the second electrode layer is deformable in a direction opposite to the first electrode layer;
wherein the first electrode layer comprises:
a plurality of transmitting electrodes disposed in an array, wherein the adjacent transmitting electrodes are electrically connected to each other in a first direction;
a plurality of pressure sensing electrodes disposed in an array, wherein the adjacent pressure sensing electrodes are electrically connected to each other in the first direction, and the pressure sensing electrodes and the transmitting electrodes are distributed in a staggered manner and insulated from each other;
wherein the second electrode layer comprises:
a plurality of pressure receiving electrodes disposed in an array, wherein the adjacent pressure receiving electrodes are electrically connected to each other in a second direction, and the second direction is perpendicular to the first direction;
wherein the pressure receiving electrodes and the pressure sensing electrodes are aligned with respect to each other, and the pressure receiving electrodes and the transmitting electrodes are disposed in a staggered manner;

when the display panel receives a touch force, the transmitting electrodes and the pressure receiving electrodes are configured to form a first capacitance to determine a position of the touch force; the pressure sensing electrodes and the pressure receiving electrodes are configured to form a second capacitance to determine a magnitude of the touch force, wherein the second electrode layer comprises a deformation supporting layer and a passivation layer, the deformation support layer is disposed between the first electrode layer and the passivation layer, and the pressure receiving electrodes are disposed in the passivation layer, wherein a first spacer and a second spacer are further disposed in the deformation supporting layer, the first spacer is disposed between the transmitting electrodes and the pressure receiving electrodes, the second spacer is disposed between the pressure sensing electrodes and the pressure receiving electrodes, and a height of the second spacer is smaller than a height of the first spacer, the first spacer being used for maintaining a distance between the pressure receiving electrodes and the transmitting electrodes unchanged, and the second spacer being used for maintaining a certain gap between the pressure receiving electrodes and the pressure sensing electrodes.

8. The display device of claim 7, wherein an insulating material is distributed between the transmitting electrode and the pressure sensing electrode.

9. The display device of claim 7, wherein an area of the pressure receiving electrode is larger than an area of the pressure sensing electrode.

10. The display device of claim 7, wherein shapes of the transmitting electrodes, the pressure sensing electrodes, and the pressure receiving electrodes are rhombus, square, or hexagon.

11. The display device of claim 7, wherein the three-dimensional touch sensor further comprises an array substrate disposed on a side of the first electrode layer of the three-dimensional touch sensor close to the display panel.

12. The display device of claim 7, wherein the three-dimensional touch sensor further comprises a packaging cover plate disposed on a side of the second electrode layer of the three-dimensional touch sensor away from the display panel.

13. The display device of claim 7, wherein the display panel is a liquid crystal display panel, an OLED display panel, a mini-LED display panel, or a micro-LED display panel.

14. The display device of claim 7, wherein a display mode of the display panel is one of a vertical alignment type, an in-plane switching type, a twisted nematic type, and an fringe field switching type.

15. The display device of claim 7, wherein the transmitting electrodes, the pressure sensing electrodes, and the pressure receiving electrodes are transparent electrodes.

16. The display device of claim 7, wherein the deformation supporting layer is made of a transparent flexible material.

* * * * *